Oct. 22, 1940.  S. H. KENNEDY  2,218,885
COMBINED PLOW AND HARROW
Filed Nov. 6, 1939  3 Sheets-Sheet 1
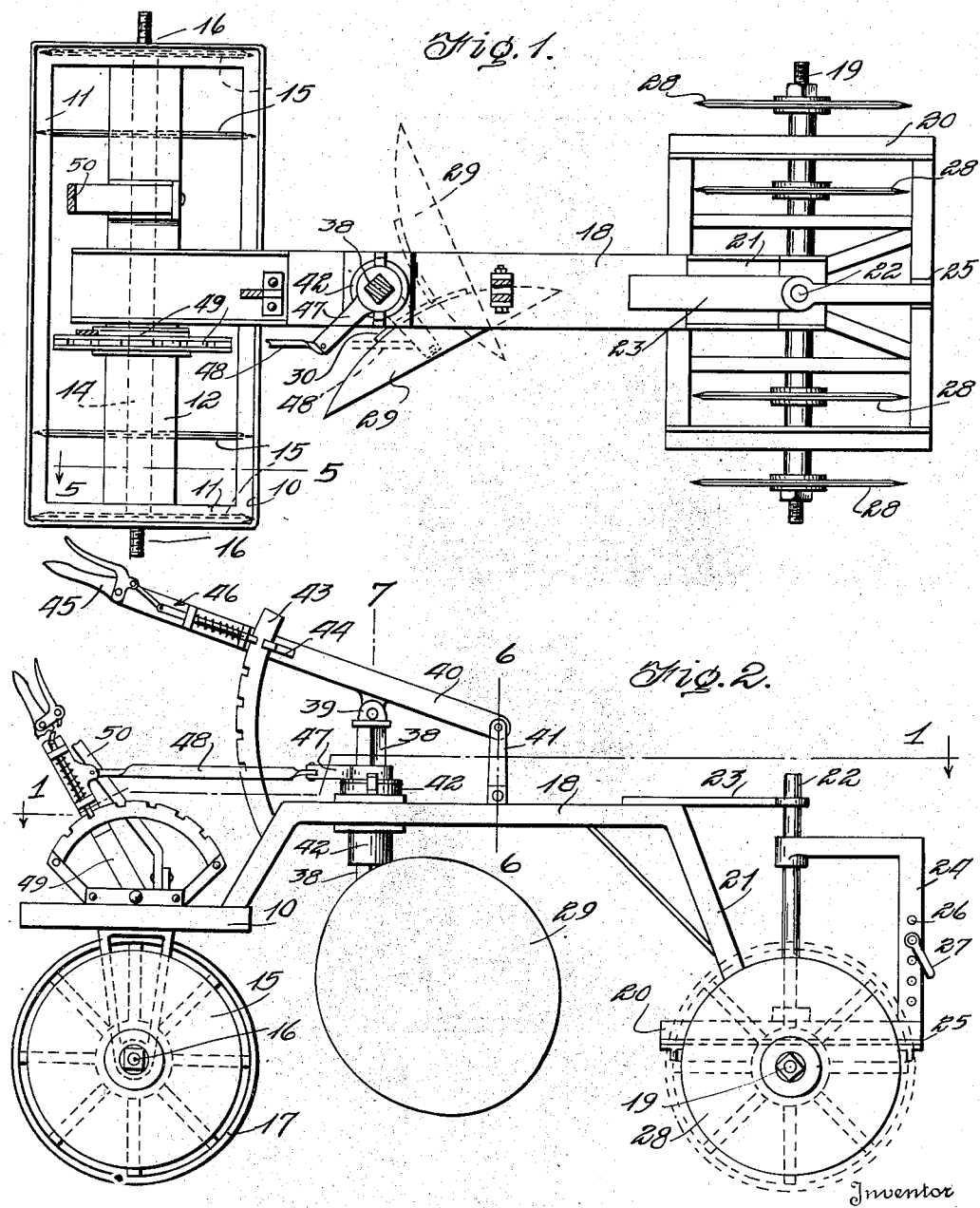

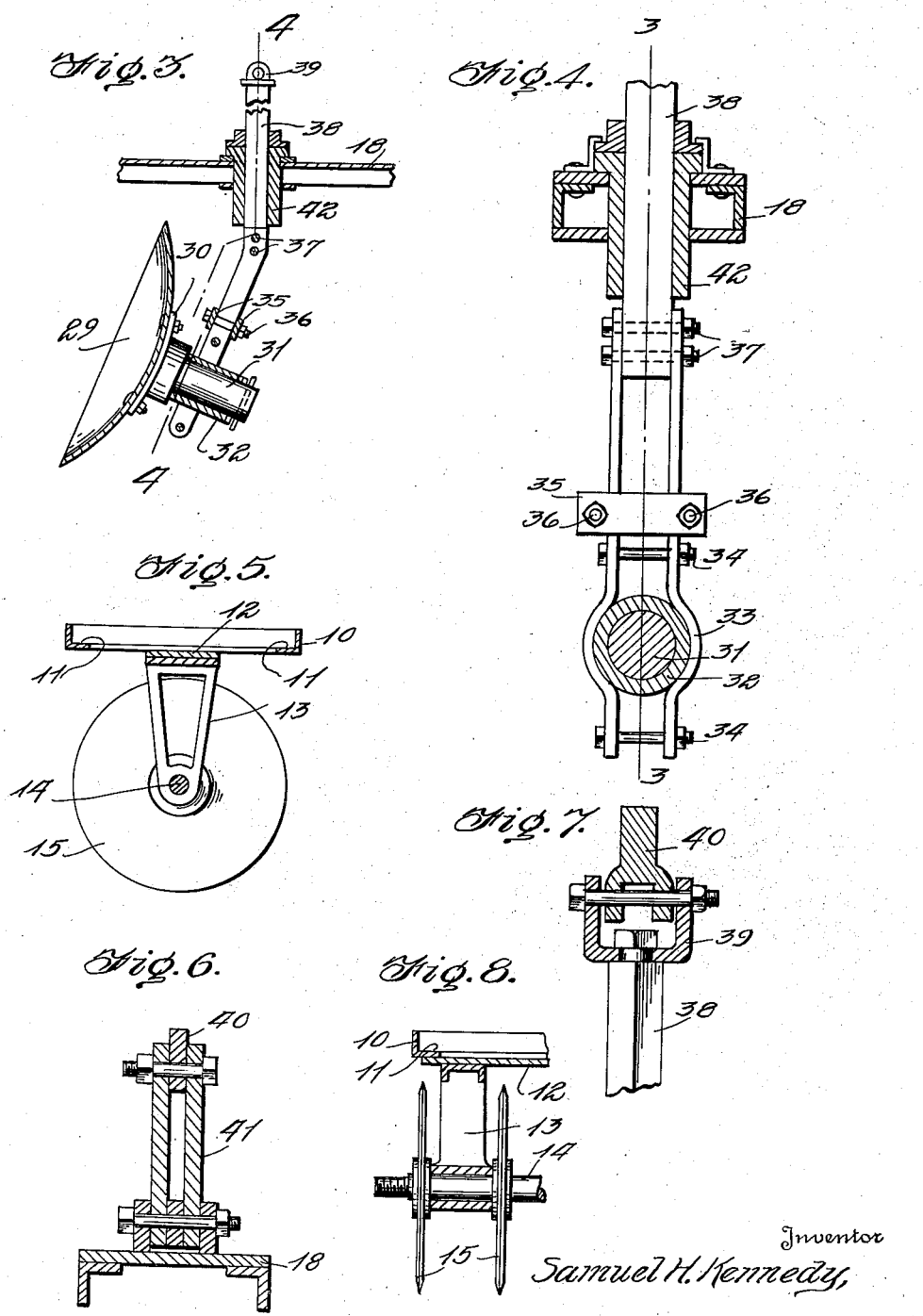

Oct. 22, 1940.  S. H. KENNEDY  2,218,885
COMBINED PLOW AND HARROW
Filed Nov. 6, 1939  3 Sheets-Sheet 3

INVENTOR.
Samuel H. Kennedy
BY
Frank S. Appleman,
ATTORNEYS.

Patented Oct. 22, 1940

2,218,885

UNITED STATES PATENT OFFICE 2,218,885

COMBINED PLOW AND HARROW

Samuel H. Kennedy, Knoxville, Tenn.

Application November 6, 1939, Serial No. 303,133

8 Claims. (Cl. 97—4)

This invention relates to agricultural implements and particularly to a combined plow and harrow, the harrow being of the disk type.

It is an object of this invention to provide an implement which is effective to score or cut into the soil so as to facilitate the action of the plowing disk; the said implement also having a plurality of disks which follow the plowing disk which are effective to cut or disintegrate the soil turned by the plowing disk.

It is a further object of the invention to provide traction wheels which are effective to support the implement while it is being transported when not in operation, the same preferably comprising wheels demountably applied to the shafts or axles on which the disks are mounted.

It is a still further object of the invention to provide novel means for adjusting the plowing disk for a right or left hand operation or furrow-forming activity and to provide novel means by which the plowing disk may be raised and supported in an inoperative position while the implement is being employed as a disk harrow.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a sectional view of the implement on the line 1—1 of Fig. 2;

Figure 2 illustrates a view in side elevation thereof;

Figure 3 illustrates a detail sectional view of the plowing disk and its mounting, the section on the line 3—3 of Fig. 4;

Figure 4 illustrates a sectional view of a part of the said plowing disk mounting on the line 4—4 of Fig. 3;

Figure 5 illustrates a sectional view of the rear carriage of the implement on the line 5—5 of Fig. 1;

Figure 6 illustrates a sectional view on the line 6—6 of Fig. 2;

Figure 7 illustrates a sectional view on the line 7—7 of Fig. 2;

Figure 8 illustrates a section at right angles to Fig. 5;

Figure 9:
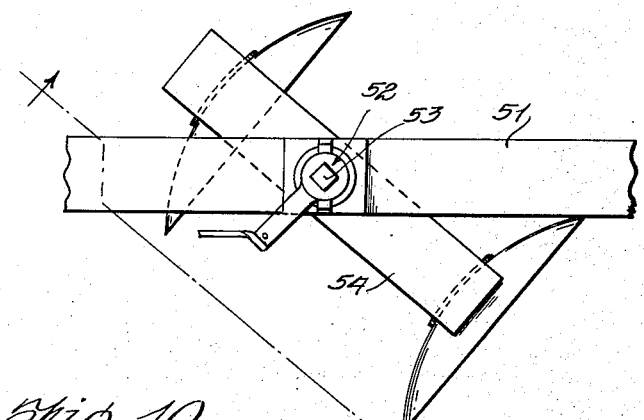
Figure 9 illustrates a plan view of a fragment of the implement showing the installation of two disks.
Figure 10:
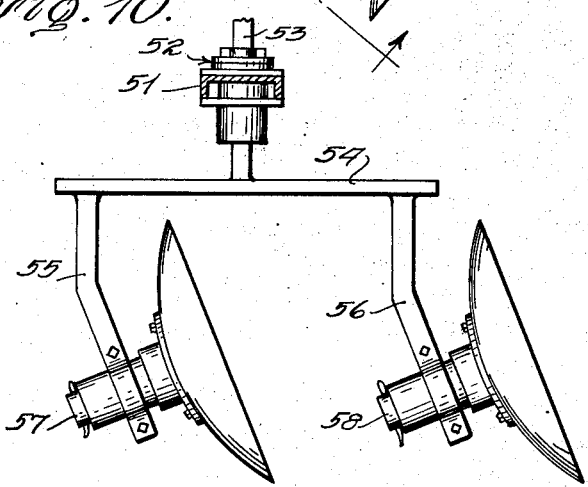
Figure 10 illustrates a sectional view on the irregular dotted line 10—10 of Fig. 9.

In these drawings 10 denotes a rectangular frame which is transversely arranged as a part of the rear carriage of the implement, and it preferably comprises side and end frame members of angle iron construction, the horizontal flanges 11 of which may act as supports for weights, whereas the vertical flanges confine the weights against being shifted or dislodged from the frame. The end frame members support the ends of a plate 12 that are secured to the horizontal flanges 11. It is the purpose of the inventor that wherever practicable the metal members where they are joined together shall be so joined by welding processes, although of course mechanical fastenings such as bolts or rivets may be substituted therefor, but mechanical fastenings have been omitted wherever the joints can be effected by welding or the like. The ends of the plate 12 are, as stated, applied to the horizontal flanges of the end members of the rear frame, and the said plate has standards 13 attached to it and the said standards support a shaft 14 on which harrow disks 15 are mounted. It is obvious that in this assembly the shaft may be rotatably mounted and the harrow disks attached to them, or the shaft may be fixed in position and the disks rotatably mounted on the shaft. The ends 16 of the shaft are supplied with traction wheels 17 that are removably applied in order that when the implement is to be transported in inoperative condition, the traction wheels may be mounted on the shaft, whereas when the implement is to operate as a plow-harrow, the traction wheels are removed.

A longitudinally extending beam 18 may be of the general configuration as shown in Fig. 2, having its rear end attached to the plate 12 and its front end supported by a shaft 19 extending transversely of a front frame 20, it being shown that the forward end of the beam has a depending portion 21 that terminates where it is attached to the shaft 19. A post 22 has a brace 23 whose inner end is attached to the beam as shown in Fig. 2, and this post is anchored to the end of the depending portion 21 of the beam.

A draft rigging 24 has one end anchored to the post 22 and its forward end extends downwardly and is attached to the horizontal portion of the front frame member, as at 25. The draft rigging may be of any appropriate type with provision such as the apertures 26, which permits adjustment of the hitch 27 to different heights for regulating the draft.

The front shaft 19 is provided with traction wheels such as those described for transporting the implement in an inoperative condition, and the said shaft 19 is provided with harrow disks 28 which may be mounted on the shaft as explained with relation to the mounting of the rear disks 15. It is seen from an inspection of Fig. 1 that the disks 28 are offset laterally with respect to the lines of the disks 15 so that the disks 15 move in a line offset with relation to the courses traveled by the disks 28, thus providing for a greater range of action.

The plowing disk 29, in the present embodiment of the invention, has a back plate 30 attached to it, and the said plate carries a stub shaft 31 which is journalled in a sleeve 32 held by a clamp 33, the members of which are drawn into clamping action by bolts 34. The clamping members are preferably engaged on opposite edges by plates such as 35, held in engagement with the clamping members by bolts such as 36. The upper ends of the clamping members are secured as at 37 to a vertically adjustable standard 38 which is connected by a yoke or coupling 39 to an operating lever 40, the said lever being pivotally mounted on a standard 41 carried by the beam. There is a loose and swivel connection of the yoke with the standard 38, as shown in Fig. 7, so that the standard 38 may partially rotate to locate the disk 29 for right or left hand furrow-forming operations. The standard is slidable in a sleeve 42 rotatably mounted on the beam by an assembly illustrated in Fig. 4. As the details of this assembly may be variously modified, it is believed unnecessary to describe the same in detail for an understanding of the invention by one skilled in the art. The lever 40 oscillates in engagement with or operative relation to a toothed segment 43 attached to the beam, and the said lever has a guide 44 which embraces the edge of the segment so that it is thereby held in operative relation to the segment.

The handle 45 of the lever has a conventional type of detent or latch mechanism, generally identified by the assembly 46, so that the latch may be operated to engage the segment for holding the lever in different positions. It is the purpose of the inventor that the degree of movement afforded shall be sufficient to elevate and hold the plowing disk clear of the soil when the implement is to be used as a harrow, but the arrangement should also be such that the plowing disk may be lowered to operative position and held when the plowing operation is desired.

The standard 38 is rotatable, as has been stated and shown, and it is the purpose of the inventor that this standard shall be moved to locate the plowing disk in either of the two positions in which the plowing disk is shown in Fig. 1 and, to that end, an arm 47 is attached to the standard, projecting at appropriate angle therefrom and a link 48 which is connected to the arm and to an operating lever 49 serves to move the arm to the different positions indicated, and the lever is held at different positions of adjustment by the assembly shown in side elevation, Fig. 2, the details of which are so apparent that it is believed unnecessary to describe them.

The standard 50 which is attached to the beam may be provided with a seat of any usual type, but as this is a detail which may be modified, it is believed unnecessary to show or describe the same.

As a modified construction, provision may be made for using a plurality of plowing disks and in this form of the invention, a beam 51 similar to the beam of the construction heretofore described is employed, and it is provided with an assembly 52 in which a standard 53 is rotatably mounted, the said standard being partially rotated by mechanism similar to the parts 47, 48 of the first described form, so that the standard will partially rotate, as stated. The standard is connected to a beam or cross member 54 preferably centrally of the cross member, but that may be modified to suit particular requirements. Near each end of the cross member, mountings 55 and 56 are provided, in which shafts 57 and 58 are respectively rotatably mounted and the construction of these parts is the same in general character as those described in connection with the explanation of the plowing disk mountings shown in Figs. 3 and 4, so that by adjusting the beam 54 by rotating it, the width of the furrow produced by the action of the plowing disks can be regulated, and obviously, a greater number than two such disks could be employed by the use of longer cross members such as 54.

Figure 11:
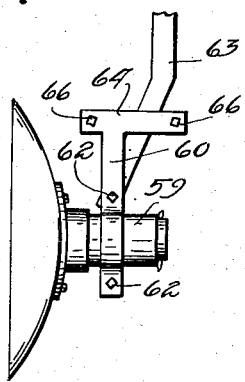
Figure 11 is a detail view of a means for adjusting the pitch of a disk.
Figure 12:
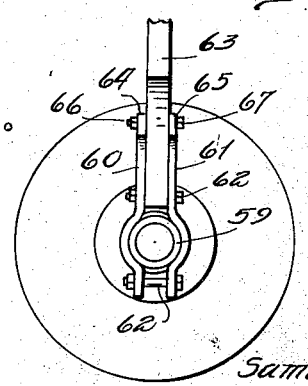
Figure 12 illustrates a view thereof at right angles to that shown in Fig. 11.

In Figs. 11 and 12 there is shown a means by which the plowing disks may be tilted to different angles and held at different positions of adjustment. In this form, the sleeves 59 which correspond to the sleeve 32 in Fig. 3 are partially embraced by two members 60 and 61 of a clamp which is bound around the sleeves and held by fastenings 62, such as bolts or the like. One of the bolts 62 extends through a standard 63 and the clamp is oscillative with respect to the said standard. The clamping members 60 and 61 have approximately right angular extensions 64 and 65 which extend across the sides of the beam and these extensions are held at different positions of adjustment by binding members 66 and 67 which are effective to frictionally retain the adjusting device at different positions.

It is obvious from an inspection of Fig. 1 that if the members 60 and 61 are oscillated on the member 62 which act as a pivot, the plowing disk can be tilted and adjusted to perform the best results according to the work to be performed and thereafter secured by the binding means heretofore described to efficiently and effectively retain the parts in the different positions.

As the objects of the invention have been stated and as the functions of the several parts have also been stated in connection with a description of the said parts, a resumé of the operation of the implement as a whole is believed unnecessary for an understanding of the invention by one skilled in the art.

I claim:

1. In an agricultural implement, a rear frame and a front frame, a beam having its ends attached to the frames, shafts supported from the frames, harrow disks on the said shafts in spaced relation to one another, the disks of the front shaft being offset laterally with respect to the disks on the rear shaft, a plowing element interposed between the front frame and the rear frame having a mounting including a standard vertically adjustable through the beam, means for partially rotating the standard to position the plowing element on either side of the beam, and means for vertically adjusting the standard and for holding it in different positions of adjustment.

2. In a combined plow and harrow, a rear frame and a front frame, a beam having its ends connecting the two frames, suitably mounted shafts under the said frames and connected thereto, disks on the said shafts, those on one shaft being offset laterally with relation to the disks on the other shaft, traction wheels applicable to said shafts larger than the disks whereby the implement may be transported with the disks out of operative positions, a powing disk between the said frames having a stub shaft, a sleeve in which said stub shaft is rotatable, a clamp for holding the sleeve, a vertically adjustable standard to which the clamp is attached, means for partially rotating the standard and for holding it in different positions of adjustment, means for moving the standard vertically and for holding it in different positions of adjustment, and a draft rigging connected to the front frame.

3. In a combined plow and harrow, a rear frame and a front frame, a beam having its ends connecting the two frames, suitably mounted shafts under the said frames and connected thereto, disks on the said shafts, those on one shaft being offset laterally with relation to the disks on the other shaft, traction wheels applicable to said shafts larger than the disks whereby the implement may be transported with the disks out of operative positions, a plowing disk between the said frames having a stub shaft, a sleeve in which said stub shaft is rotatable, a clamp for holding the sleeve, a vertically adjustable standard to which the clamp is attached, means for partially rotating the standard and for holding it in different positions of adjustment, means for moving the standard vertically and for holding it in different positions of adjustment, and a draft rigging connected to the front frame comprising a post, means on the beam for bracing the post, and an angular member having one end anchored to the post and the other end anchored to the frame.

4. In a combined plow and harrow, a rear frame and a front frame, harrow disks mounted for operation with relation to the two frames, the disks of one frame being out of alinement with those of the other frame, a beam connecting the frames, a standard mounted in the beam for rotative and vertical movement, a plowing disk carried by the said standard, means for moving the standard vertically and holding it at different elevations, and means for turning the standard and holding it at different positions of adjustment.

5. In a combined plow and harrow, a rear frame and a front frame, harrow disks mounted for operation with relation to the two frames, the disks of one frame being out of alinement with those of the other frame, a beam connecting the frames, a sleeve rotatably mounted in the beam, said sleeve having an opening therethrough angular in cross section, a standard of similar configuration to that of the opening slidable therein, a plowing disk carried by the standard, means for moving the standard vertically and holding it at different positions of adjustment, and means for rotating the sleeve and holding it in different positions of adjustment whereby the plowing disk is moved to either side of the beam.

6. In a combined plow and harrow, a rear frame and a front frame, harrow disks mounted for operation with relation to the two frames, the disks of one frame being out of alinement with those of the other frame, a beam connecting the frames, a standard mounted in the beam for rotative and vertical movement, means for adjusting the standard and for holding it at different positions of adjustment, a cross member attached to the said standard, plowing disks, and means for mounting the said plowing disks on the cross member.

7. In a combined plow and harrow, a rear frame and a front frame, harrow disks mounted for operation with relation to the two frames, the disks of one frame being out of alinement with those of the other frame, a beam connecting the frames, a standard mounted in the beam for rotative and vertical movement, a plowing disk mounted on said standard, and means for adjusting the plowing disk with relation to the standard whereby the axis of the said plowing disk may be held at different angles with relation to the standard.

8. In a combined plow and harrow, a rear frame and a front frame, harrow disks mounted for operation with relation to the two frames, the disks of one frame being out of alinement with those of the other frame, a beam connecting the frames, a standard mounted in the beam for rotative and vertical movement, a plowing disk having a shaft, a sleeve in which said shaft is rotatably mounted, a clamp attached to the sleeve, and means for adjustably holding the clamp with relation to the standard whereby the axis of the plowing disk shaft is adjustably held with relation to the standard for controlling the angle of the plowing disk with relation thereto.

SAMUEL H. KENNEDY.